United States Patent
Prost et al.

(10) Patent No.: US 7,128,112 B2
(45) Date of Patent: Oct. 31, 2006

(54) TIRE FOR TWO-WHEELED VEHICLES COMPRISING CIRCUMFERENTIAL CROWN REINFORCEMENT ELEMENTS

(75) Inventors: Pascal Prost, Riom (FR); Alain Valle, Cebazat (FR); Yann Chaylard, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/053,444

(22) Filed: Feb. 9, 2005

(65) Prior Publication Data
US 2005/0183809 A1    Aug. 25, 2005

Related U.S. Application Data

(63) Continuation of application No. PCT/EP03/08707, filed on Aug. 6, 2003.

(30) Foreign Application Priority Data

Aug. 9, 2002   (FR) .................................. 02 10186
Nov. 18, 2002  (FR) .................................. 02 14414

(51) Int. Cl.
  B60C 9/22    (2006.01)
  B60C 9/28    (2006.01)
  B60C 13/00   (2006.01)

(52) U.S. Cl. ................. 152/531; 152/526; 152/533; 152/538; 152/555; 152/DIG. 19

(58) Field of Classification Search ............... 152/526, 152/531, 533, DIG. 19, 555, 538
See application file for complete search history.

(56) References Cited

U.S. PATENT DOCUMENTS

| | | | |
|---|---|---|---|
| 1,188,062 A * | 6/1916 | Gammeter | 152/531 X |
| 2,388,421 A * | 11/1945 | Kraft et al. | 152/531 X |
| 2,884,040 A * | 4/1959 | Saint-Frison | 152/531 X |
| 3,895,665 A * | 7/1975 | Heling et al. | 152/531 X |
| 5,301,730 A | 4/1994 | Delias | |
| 5,759,314 A * | 6/1998 | Southarewsky | 152/531 X |
| 5,902,425 A * | 5/1999 | Armellin | 152/531 X |
| 6,533,012 B1 | 3/2003 | Jardine et al. | |
| 6,622,764 B1 * | 9/2003 | Allen et al. | 152/531 |
| 6,776,205 B1 * | 8/2004 | Pereira et al. | 152/531 X |
| 2003/0145935 A1 | 8/2003 | Prost et al. | |

(Continued)

FOREIGN PATENT DOCUMENTS

DE    37 27 522 A1 *  3/1989  ................. 152/531

(Continued)

*Primary Examiner*—Adrienne C. Johnstone
(74) *Attorney, Agent, or Firm*—Buchanan Ingersoll & Rooney PC (57) ABSTRACT

A tire for a two-wheeled motorized vehicle and more particularly a motorcycle includes at least one carcass-type reinforcement structure, formed of reinforcement elements, anchored one either side of the tire to a bead intended to be mounted on a rim seat. Each bead is extended radially towards the outside by a sidewall, the sidewalls meeting up radially towards the outside with a tread. Under the tread is a crown reinforcement structure including a layer of circumferential reinforcement elements. In accordance with the profile of the tire in a radial plane, the layer of circumferential elements is at least in part radially to the inside of the part of at least one carcass-type reinforcement structure radially to the outside of the two points of tangency of the curvilinear abscissa of the carcass-type reinforcement structure with perpendiculars to the axis of rotation, and the circumferential reinforcement elements are distributed in the transverse direction with a variable pitch.

16 Claims, 5 Drawing Sheets

U.S. PATENT DOCUMENTS

2005/0061413 A1* 3/2005 Chaylard ................ 152/531

FOREIGN PATENT DOCUMENTS

| EP | 0 191 124 | | 8/1986 | |
| FR | 2 796 005 A1 | * | 1/2001 | |
| GB | 1 038 769 | | 8/1966 | |
| JP | 06055907 A | * | 3/1994 | 152/526 |
| JP | 06115311 A | * | 4/1994 | 152/526 |
| WO | WO-02/09956 A1 | * | 2/2002 | |

* cited by examiner

TIRE FOR TWO-WHEELED VEHICLES COMPRISING CIRCUMFERENTIAL CROWN REINFORCEMENT ELEMENTS

This application is a continuation of International Application Ser. No. PCT/EP03/08707 filed on Aug. 6, 2003, and which claims priority of application Ser. No. 02/10186 filed on Aug. 9, 2002 and application Ser. No. 02/14414 filed on Nov. 18, 2002 filed in France.

The present invention relates to a tire intended to be fitted on a vehicle and more particularly intended to be fitted on a two-wheeled vehicle such as a motorcycle.

BACKGROUND

Although not limited to such an application, the invention will be more particularly described with reference to such a motorcycle, or motorbike, tire.

Tire reinforcement armatures or tire reinforcements, in particular for motorcycle tires, are currently—and most frequently—formed by stacking one or more plies conventionally designated "carcass plies", "crown plies", etc. This way of designating reinforcement armatures stems from the manufacturing process, which consists of making a series of semi-finished products in the form of plies, provided with, often longitudinal, cord reinforcements, which are then assembled or stacked so as to build a tire blank. The plies are made flat, with large dimensions, and are then cut as a function of the dimensions of a given product. The plies are also assembled substantially flat in a first phase. The blank thus produced is then shaped into the toroidal profile typical of tires. The semi-finished products known as "finishing products" are then applied to the blank, in order to obtain a product which is ready for vulcanization.

Such a "conventional" type of process involves, in particular for the tire blank manufacturing phase, the use of an anchoring element (generally a bead wire), used to effect anchoring or retention of the carcass reinforcement in the tire bead zone. Thus, for this type of process, a turn-up is formed from a portion of all the plies constituting the carcass reinforcement (or of only some) around a bead wire disposed in the bead of the tire. The carcass reinforcement is thereby anchored in the bead.

The widespread use in the industry of this type of conventional process, despite numerous variants in the manner of producing the plies and the assemblies, has led the person skilled in the art to use a vocabulary derived from the process; hence the terminology in general use, comprising in particular the terms "plies", "carcass", "bead wire", "shaping" to designate transition from a flat profile to a toroidal profile, etc.

Tires now exist which do not strictly speaking comprise "plies" or "bead wires" which fit the above definitions. For example, document EP 0 582 196 describes tires manufactured without the aid of semi-finished products in the form of plies. For example, the reinforcement elements of the various reinforcement structures are applied directly onto the adjacent layers of rubber mixes, the whole being applied in successive layers onto a toroidal core whose shape allows the direct obtainment of a profile resembling the final profile of the tire in the process of being manufactured. Thus, in this case there are no longer "semi-finished products", or "plies" or "bead wires". The basic products such as the rubber mixes and the reinforcement elements in the form of cords or filaments are applied directly to the core. Since this core is toroidal in shape, the blank no longer has to be shaped in order to be transformed from a flat profile to a profile in the form of a torus.

Furthermore, the tires described in this document do not have the "traditional" carcass ply turn-up about a bead wire. This type of anchoring is replaced by an arrangement in which circumferential cords are disposed adjacent to said sidewall reinforcing structure, the whole being immersed in an anchoring or bonding rubber mix.

Assembling processes using a toroidal core also exist which use semi-finished products specially adapted for rapid, effective and simple laying on a central core. Finally, it is also possible to use a composite comprising certain semi-finished products to achieve certain architectural aspects (such as plies, bead wires, etc), while others are achieved by the direct application of mixes and/or reinforcement elements.

In the present document, so as to take account of recent technological developments both in the field of manufacture and in the design of products, the conventional terms such as "plies", "bead wires" etc are advantageously replaced by neutral terms or terms which are independent of the type of process used. Thus, the term "reinforcement of carcass type" or "sidewall reinforcement" may be used to denote the reinforcement elements of a carcass ply in the conventional process and the corresponding reinforcement elements, generally applied at the level of the sidewalls, of a tire produced according to a process not using semi-finished products. The term "anchoring zone", for its part, may denote both the "traditional" carcass ply turn-up about a bead wire of a conventional process and the assembly formed by the circumferential reinforcement elements, the rubber mix and the adjacent sidewall reinforcement portions of a bottom zone produced using a process involving application on a toroidal core.

As in the case of all other tires, we are witnessing the radialization of motorcycle tires, the architecture of such tires comprising a carcass reinforcement formed of one or two plies of reinforcement elements forming with the circumferential direction an angle which may be between 65° and 90°, said carcass reinforcement being radially surmounted by a crown reinforcement formed at least of generally textile reinforcement elements. Non-radial tires do still exist, however, and the invention also relates to them. The invention also relates to partially radial tires, that is to say whose reinforcement elements of the carcass reinforcement are radial over at least part of said carcass reinforcement, for example in the part corresponding to the crown of the tire.

Numerous crown reinforcement architectures have been proposed, depending on whether the tire is intended to be fitted at the front of the motorcycle or at the rear. A first structure consists, for said crown reinforcement, in using solely circumferential cables, and said structure is more particularly used for the rear position. A second structure, directly inspired by structures commonly used in passenger-vehicle tires, has been used to improve wear resistance, and consists in using at least two crown plies of reinforcement elements which are parallel to each other within each ply but crossed from one ply to the next, forming acute angles with the circumferential direction, such tires being more particularly suitable for the front of motorcycles. Said two crown plies may be surmounted radially by at least one ply of circumferential elements, generally obtained by helical winding of a strip of at least one reinforcement element coated with rubber. Patent no. FR 2 561 588 thus describes such a crown reinforcement, having at least one ply whose reinforcement elements form with the circumferential direction an angle which may vary between 0° and 8°, the modulus of elasticity of such elements amounting to at least 6000 N/mm², and, disposed between the carcass reinforcement and the ply of circumferential elements, a shock-absorption layer formed mainly of two plies of elements crossed from one ply to the next forming between them angles of between 60° and 90°, said crossed plies being formed of textile reinforcement elements having a modulus of elasticity of at least 6000 N/mm².

Document EP 0 456 933, with a view to providing a motorcycle tire with excellent stability at high speed as well as excellent contact with the ground, teaches for example that a crown reinforcement should be made with at least two plies: a first ply, radially the closest to the carcass reinforcement, being composed of cables oriented at an angle of between 40° and 90° relative to the circumferential direction and the second ply, radially the closest to the tread, being composed of cables wound helically in the circumferential direction.

U.S. Pat. No. 5,301,730, with a view to enhancing the drive ability of a tire designed for the rear of a motorcycle, proposes a crown reinforcement composed, proceeding from the radial carcass reinforcement to the tread, of at least one ply of substantially circumferential elements and two plies of elements crossed from one ply to the next and forming with the circumferential direction an angle which may be between 35° and 55°, elements of aromatic polyamide being suitable for use as the ply of elements parallel to the circumferential direction and aliphatic polyamide being suitable for the plies of crossed elements.

The production of such tires and in particular of tires comprising the circumferential cables require non-negligible manufacturing times resulting in elevated production costs. Furthermore, the quantity of material necessary to produce tires comprising these circumferential cables also contributes to the magnitude of these costs.

The object of the invention is to provide motorcycle tires comprising at least one layer of circumferential elements at lower cost than those currently obtained, without for all that impairing the properties required to satisfy the users.

SUMMARY OF INVENTION

This object has been achieved according to the invention by a tire comprising at least one carcass-type reinforcement structure, formed of reinforcement elements, anchored on either side of the tire to a bead whose base is intended to be mounted on a rim seat, each bead being extended radially towards the outside by a sidewall, the sidewalls meeting up, radially towards the outside, with a tread, said tire also comprising under the tread a crown reinforcement structure consisting of at least one layer of circumferential reinforcing elements, such as in accordance with the profile of the tire in a radial plane, said layer of circumferential elements being at least in part radially to the inside of the part of at least one carcass-type reinforcement structure radially to the outside of the two points of tangency of the curvilinear abscissa of the carcass-type reinforcement structure with perpendiculars to the axis of rotation and said circumferential reinforcement elements being distributed in the transverse direction with a variable pitch.

According to a first embodiment of the invention, said pitch at the centre (crown) of the tread is smaller than at the edges of said layer. Such an embodiment according to the invention in particular promotes resistance to external stresses which are greater in the central zone of the tire.

According to a second embodiment of the invention, said pitch at the centre (crown) of the tread is greater than at the edges of said layer. Such an embodiment according to the invention in particular promotes flattening of the tire on a severe camber.

According to the invention, the reinforcement elements are described as circumferential when they form an angle with the longitudinal direction of less than 8°.

Advantageously, in the case of a radial structure, the reinforcement elements of the carcass-type reinforcement structure form an angle of between 65° and 90° with the circumferential direction.

The centre or crown of the tread is defined by the equatorial plane of the tire.

The longitudinal direction of the tire, or circumferential direction, is the direction corresponding to the periphery of the tire and defined by the rolling direction of the tire.

The transverse or axial direction of the tire is parallel to the axis of rotation of the tire.

The circumferential reinforcement elements may be formed by helical winding of one or more independent cords. They may also be produced from strips comprising several cords immersed in a material such as rubber.

The term "cord" generally denotes any of monofilaments, multifilament fibers (possibly twisted around themselves) or assemblies such as textile or metal cables, plied yarn or alternatively any type of equivalent assembly such as, for example, a hybrid cable, this being the case whatever the material(s) or the possible treatment of these cords, for example surface treatment or coating or pre-sizing to improve adhesion to the rubber or any other material.

The invention thus provides for at least one layer of circumferential reinforcement elements to be positioned at least in part radially to the inside of at least one carcass-type reinforcement structure. The radially internal position of at least a part of the layer of circumferential reinforcement elements allows the achievement of a shorter laying time relative to those for conventional tires, the laying radius being smaller; furthermore, for this reason the quantity of material necessary to produce the layer is also reduced. The quantity of material is reduced further due to laying according to a variable pitch, which allows optimization of the quantity of material necessary in the transverse direction.

According to another embodiment of the invention, when the tire comprises at least two reinforcement structures of carcass type, at least one layer of circumferential reinforcement elements is positioned at least in part radially to the inside of at least two reinforcement structures of carcass type to reduce further the quantity of material necessary for production of the layer of circumferential reinforcement elements.

According to one variant embodiment, said circumferential reinforcement elements are distributed in the transverse direction at a pitch which varies such that the value of the pitch in the transverse direction follows a mathematical progression over at least part of the axial width of said layer.

According to a preferred embodiment of the invention, the value of the pitch in the transverse direction follows a progression over at least part of the axial width of said layer up to the edges of said layer. According to such an embodiment, the pitch between the circumferential reinforcement elements of said layer is advantageously constant in a zone covering the crown of the tread.

According to a first embodiment, the value of the pitch follows an arithmetic progression of the type $U(n)=U_o+nr$, with $U_o$ being between 0.4 mm and 2.5 mm and r being the difference of consecutive terms of the progression, said difference being between 0.001 and 0.1.

According to a second embodiment, the value of the pitch follows a geometric progression of the type $U(n)=U_0 \times r^n$, with Uo being between 0.4 mm and 2.5 mm and r being the difference of consecutive terms of the progression, said difference being between 1.001 and 1.025.

According to other embodiments of the invention, the value of the pitch may be a combination of several progressions as a function of the axial position on said layer.

The variation in pitch between the circumferential reinforcement elements results in a variation in the number of circumferential reinforcement elements per unit length in the transverse direction and consequently in a variation in the density of circumferential reinforcement elements in the transverse direction and therefore in a variation in the circumferential rigidity in the transverse direction.

According to a preferred embodiment of the invention, when the tire comprises a layer of circumferential reinforcement elements extending in the sidewalls beyond the points of tangency of the curvilinear abscissa of the carcass-type reinforcement structure with perpendiculars to the axis of rotation, in accordance with the profile of the tire in a radial plane, the part of the layer of circumferential elements radially to the inside of the two points of tangency of the curvilinear abscissa of the carcass-type reinforcement structure with perpendiculars to the axis of rotation is radially to the inside of the carcass-type reinforcement structure, radially to the inside of the two points of tangency of the curvilinear abscissa of the carcass-type reinforcement structure with perpendiculars to the axis of rotation.

In other words, according to the invention, the part of the layer of circumferential elements radially to the outside of the two points of tangency of the curvilinear abscissa of the carcass-type reinforcement structure with perpendiculars to the axis of rotation is at least in part axially to the inside of the carcass-type reinforcement structure and the part of the layer of circumferential elements radially to the inside of the two points of tangency of the curvilinear abscissa of the carcass-type reinforcement structure with perpendiculars to the axis of rotation is axially to the outside of the carcass-type reinforcement structure.

The invention is directed at a less costly embodiment and consequently aims to diminish the laying time for the layer of circumferential elements and the quantity of material.

According to this preferred embodiment, where the layer of circumferential reinforcement elements extends in a part of the sidewalls, the radially internal position of said layer relative to the carcass structure results in positioning of the circumferential reinforcement elements after the carcass structure in this part of the tire at the time of manufacture of the tire.

It would thus seem that production of the tire or at the very least the order of positioning of the constituents according to the invention differs between at least a crown zone part and the sidewall part when the layer of circumferential reinforcement elements is also present over at least one part of the sidewalls.

A tire according to the invention, in which at least a part of the crown reinforcement structure, and more specifically at least a part of a layer of circumferential reinforcement elements, being formed radially to the inside of the carcass structure, is advantageously produced according to a manufacturing method of the hard or toroidal core type, or of the rigid form type.

It is very advantageous to produce the tire thus defined according to the invention using a hard or rigid core manufacturing method, said core defining the internal cavity of the tire. This type of manufacturing method has the advantage of arranging the various constituents necessary for production thereof directly in their final position without the profile of the tire being modified during building thereof.

One advantageous embodiment of the invention provides for the crown reinforcement structure furthermore to comprise at least one working layer consisting of reinforcement elements and for said reinforcement elements, at least in the central zone of said working layer, to form an angle with the longitudinal direction of between 10 and 80°.

The central zone of a working layer is a circumferential zone of said layer axially between two lateral zones, axially outside said central zone. According to a preferred embodiment of the invention, this central zone is centered on the crown of the tire tread.

The centre or crown of the tread is defined by the equatorial plane of the tire.

According to a preferred embodiment of the invention, the crown reinforcement structure of the tire comprises at least two layers of reinforcement elements such that from one layer to the next the reinforcement elements form between them angles of between 20 and 160°.

In a variant embodiment of the invention, in particular for improving tire grip, drive ability and comfort, the angles formed by said reinforcement elements of the working layers with the longitudinal direction are variable in the transverse direction, such that said angles are greater at the edges axially to the outside of the layers of reinforcement elements relative to the angles of said elements measured at the level of the equatorial plane of the tire. Such variations in angle allow modification of local longitudinal, meridian and shearing rigidities.

A first embodiment of this variant consists in varying the angle of the reinforcement elements in monotonic manner from the equatorial plane of the tire to the edges of the working layer.

A second embodiment of this variant consists in making the angle develop by stages from the equatorial plane of the tire as far as the edges of the working layer.

A last embodiment of this variant consists in the angle developing such that given values are obtained for given axial positions.

In other words, it may be desirable to achieve considerable circumferential rigidity of the reinforcement structure of the crown by the presence of closed, that is to say small, angles in the tire crown zone, that is to say in the zone surrounding the equatorial plane. And, on the other hand, the presence of open angles, that is to say angles tending towards 90°, may be desired at the edges of the working layer or more precisely at the level of the shoulders of the tire to improve the grip and drive ability or the comfort of the tire on a severe camber; in fact, such angles allow local modification of the rigidities of the reinforcement structure.

In an advantageous variant embodiment of the invention, a layer of circumferential reinforcement elements may be provided in several parts positioned at various radial positions or different levels of the tire. Such a tire according to the invention may in particular comprise a part of the layer of circumferential reinforcement elements radially to the outside of the other reinforcement elements and in particular radially to the outside of the carcass-type reinforcement structure in the central part of the tire, that is to say radially to the inside of the central part of the tread. This part of the hooping layer thus allows in particular protection of the carcass against any stresses which may affect the central part of the tread, considered as the most exposed. Lateral parts of the layer of circumferential reinforcement elements, independent of the central part of said layer of circumferential reinforcement elements, may be positioned at any level, that is to say either radially to the inside of the working layers or between them or indeed, according to the invention, radially to the inside of the carcass layer. The invention additionally provides, in the case of a layer of circumferential reinforcement elements made in several parts positioned in different radial positions, for the distribution of these various parts not to be symmetrical relative to the equatorial plane, or circumferential plane passing through the centre of the crown of the tire. Such an asymmetrical distribution may additionally be associated with the selection of different materials from the circumferential reinforcement elements, as mentioned above.

In accordance with this type of embodiment of a layer of circumferential reinforcement elements divided into several parts, the invention advantageously provides covering of the axial ends of said parts between them.

One advantageous embodiment of the invention provides for the layer of circumferential reinforcement elements to be positioned at least in part radially to the outside of a working layer. When the layer of circumferential reinforcement elements is produced radially to the outside of two working layers and placed radially directly to the inside of the tread, it may in particular contribute to improving stability at high speed and protecting the working layers.

The layer of circumferential reinforcement elements may thus be provided in part directly under the tread to form, in addition to its primary function, a layer for protecting the carcass ply and other layers of the crown reinforcement structure against any mechanical stresses which may occur.

According to other advantageous embodiments of the invention, the layer of circumferential reinforcement elements may also be provided between the working layers, in particular for economic reasons, the quantity of material and the laying time thus being further diminished.

Another advantageous embodiment of the invention provides for the layer of circumferential reinforcement elements to be positioned at least in part radially to the inside of the working layer radially furthest to the inside. According to this embodiment, the layer of circumferential reinforcement elements is provided radially to the inside of the working layers and may in particular allow the drive ability and grip of the tire to be improved.

It is furthermore also provided according to the invention for the carcass to be able to cover the whole crown reinforcement structure.

However, a preferred embodiment of the invention provides for at least part of a crown reinforcement layer to be positioned between the carcass and the tread to ensure protection of the carcass.

According to a preferred embodiment of the invention, the reinforcement elements of the working layers are of textile material.

Preferably also, the reinforcement elements of the layer of circumferential reinforcement elements are metal and/or textile and/or glass. The invention in particular provides for the use of reinforcement elements of various types in one and the same layer of circumferential reinforcement elements.

Preferably also, the reinforcement elements of the layer of circumferential reinforcement elements have a modulus of elasticity greater than 6000 N/mm².

BRIEF DESCRIPTION OF THE DRAWINGS

Other advantageous details and features of the invention will become clear below from the description of examples of embodiment of the invention made with reference to FIGS. 1 to 5, in which.

To simplify understanding thereof, the Figures are not to scale.

DESCRIPTION OF PREFERRED EMBODIMENTS

Figure 1:
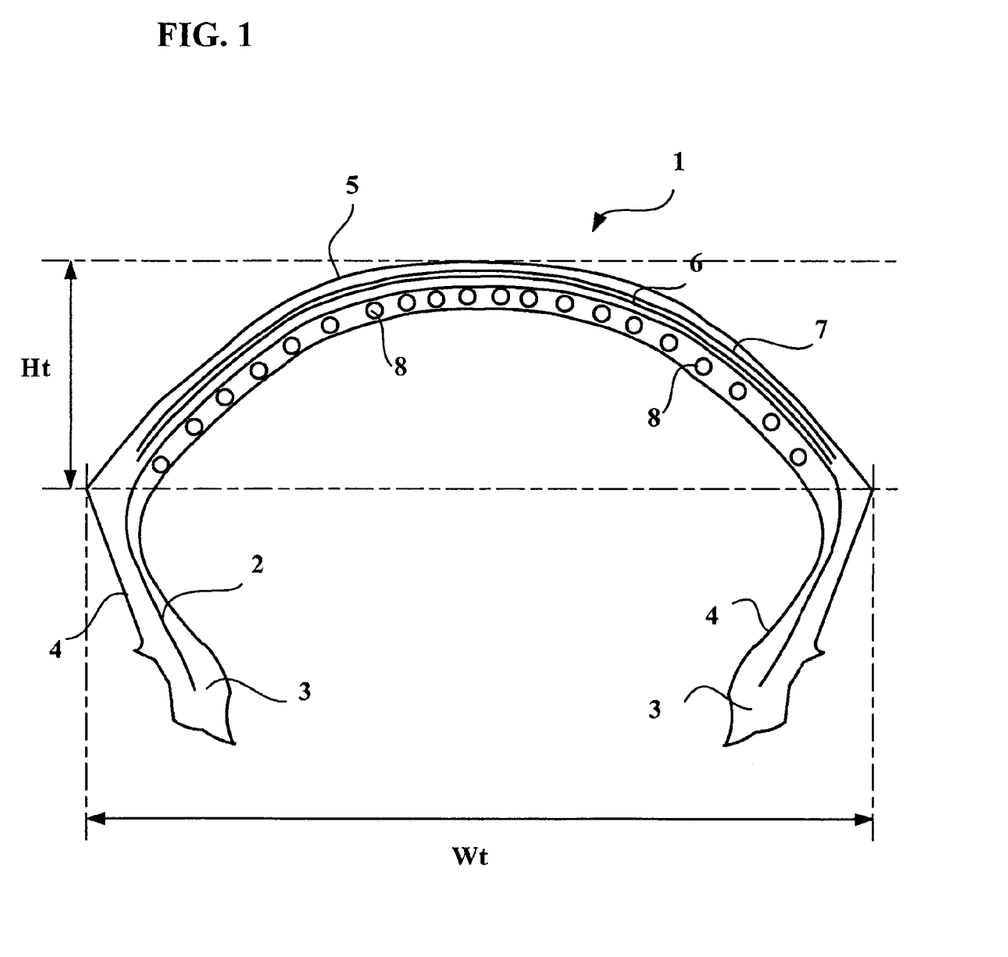
FIG. 1 is a meridian view of a diagram of a tire according to one embodiment of the invention.

FIG. 1 shows a tire 1 comprising a carcass reinforcement consisting of a single layer 2 comprising reinforcement elements of textile type. The layer 2 consists of reinforcement elements disposed radially. The radial positioning of the reinforcement elements is defined by the laying angle of said reinforcement elements; a radial arrangement corresponds to a laying angle of said elements relative to the longitudinal direction of the tire of between 65° and 90°.

Said carcass layer 2 is anchored, in a manner not illustrated in the Figures, on either side of the tire 1 in a bead 3 whose base is intended to be mounted on a rim seat. Each bead 3 is extended radially towards the outside by a sidewall 4, said sidewall 4 meeting up radially towards the outside with the tread 5. The tire 1 thus constituted has a value of curvature greater than 0.15 and preferably greater than 0.3. The value of curvature is defined by the Ht/Wt ratio, that is to say by the ratio of the height of the tread to the maximum width of the tread of the tire. The value of curvature will advantageously be between 0.25 and 0.5 for a tire intended to be fitted at the front of a motorcycle and it will advantageously be between 0.2 and 0.5 for a tire intended to be fitted at the rear.

Between the carcass and the tread there is positioned a crown reinforcement consisting in the present case of two working layers 6, 7 consisting of textile reinforcement elements. The arrangement of the cords is such that they are crossed from a layer 6 to the following layer 7.

One layer of circumferential reinforcement elements 8 is positioned radially to the inside of the carcass layer 2 and thus constitutes the part of the crown reinforcement radially to the inside.

The layer of circumferential reinforcement elements 8 advantageously consists of a single cord wound to form an angle with the longitudinal direction substantially equal to 0°. The layer of circumferential reinforcement elements 8 may also be produced by the simultaneous winding of several bare cords or cords in the form of strips when they are immersed in rubber.

Furthermore, the pitch between the circumferential reinforcement elements varies over part of the layer of circumferential reinforcement elements in the transverse or axial direction in accordance with the invention in such a way that said pitch is smaller at the crown of the tire than at the edge of the layer of circumferential reinforcement elements.

Figure 2:
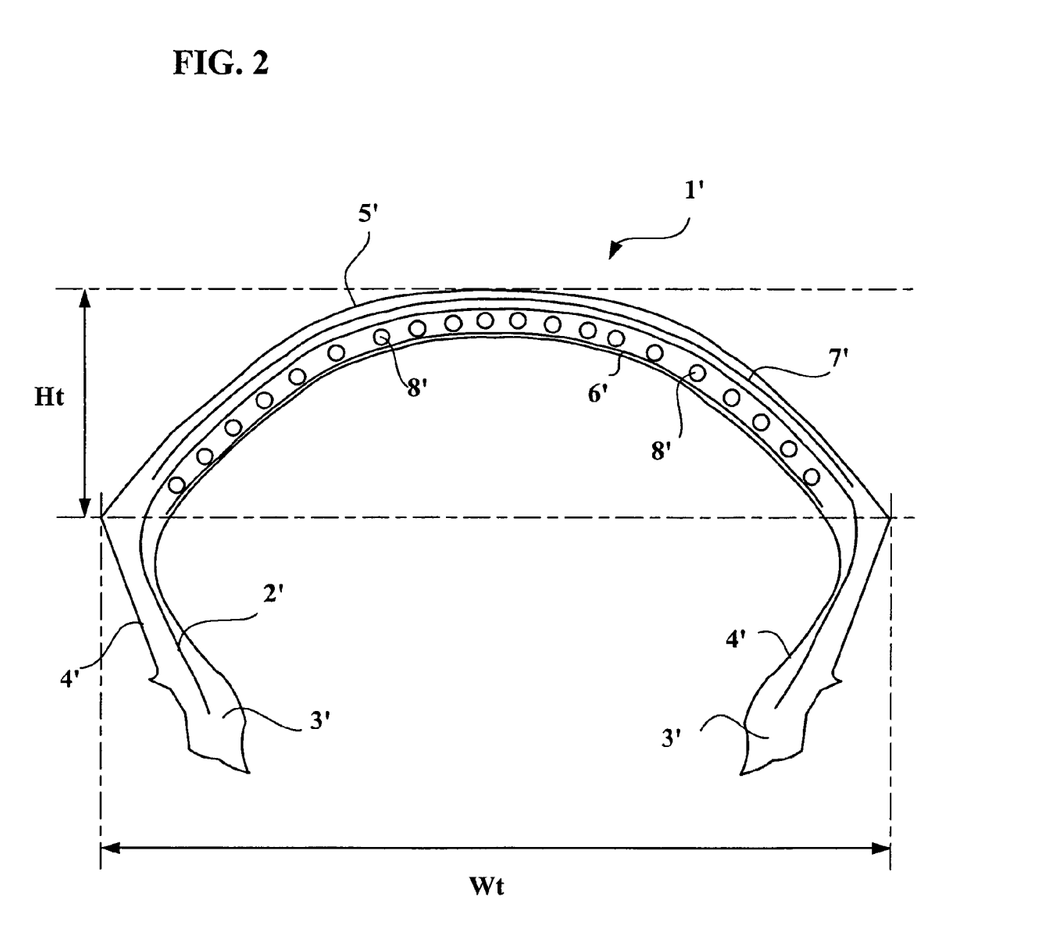
FIG. 2 is a meridian view of a diagram of a tire according to a second embodiment of the invention.

FIG. 2 shows a variant embodiment of the invention. According to this variant embodiment, the layer of circumferential reinforcement elements 8' is provided radially to the inside of the carcass layer 2', between two working layers 6' and 7' similar to those of FIG. 1. According to the representation of this variant embodiment of the invention, the layer of circumferential reinforcement elements 8' and the working layer 6' are positioned radially to the inside of the carcass layer 2' and the working layer 7' is positioned radially to the outside of the carcass layer 2'.

According to other variant embodiments of the invention which are not shown, the entire crown reinforcement structure may be positioned radially to the inside of the carcass layer 2', the carcass layer 2' covering the entire crown reinforcement structure. The layer of circumferential reinforcement elements 8' may also be positioned radially to the inside or to the outside of the working layers 6', 7'.

It is also possible to produce tires in accordance with the invention, in which only one of the working layers 6', 7' is positioned radially to the inside of the carcass ply, said working layer 6', 7' being radially to the outside of the layer of circumferential reinforcement elements 8'.

Figure 3:
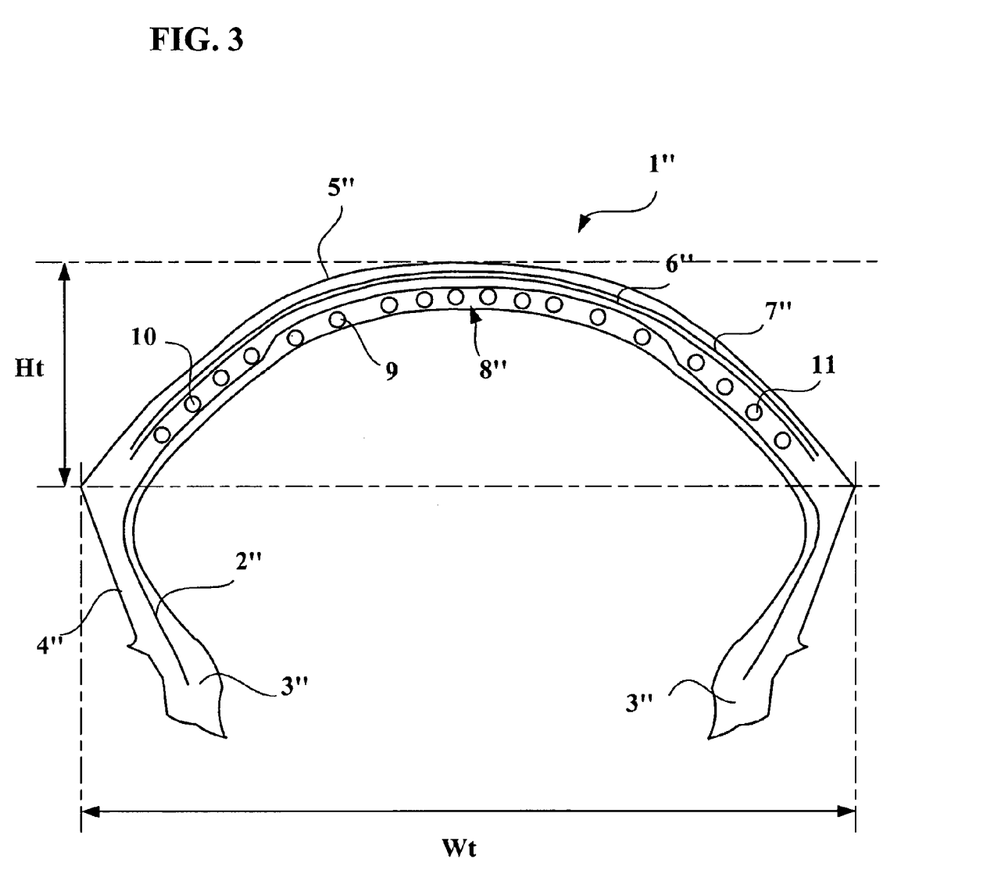
FIG. 3 is a meridian view of a diagram of a tire according to a third embodiment of the invention.

FIG. 3 shows an embodiment of the invention according to which the layer of circumferential reinforcement elements 8" is provided in a number of parts 9, 10, 11, positioned in the tire at radially different positions. Such embodiments may, for example, allow the hooping layer locally to maintain a protective role in particular with regard to the carcass ply while reducing manufacturing costs by forming said layer of circumferential reinforcement elements 8" partially in radially lower positions. This choice may also influence other properties of the tire which are only required locally. In the case shown in FIG. 3, the position of the axially outer parts 10, 11 radially to the inside of the working layers 6", 7" in particular allows an improvement in stability on severe cambers.

Such an embodiment of the layer of circumferential reinforcement elements 8" in several parts may additionally be combined with the various variant embodiments of the invention presented above. It is possible in particular to provide a layer of circumferential reinforcement elements 8" in part or wholly radially to the inside of, radially to the outside of or between the working layers 6", 7".

Figure 4:
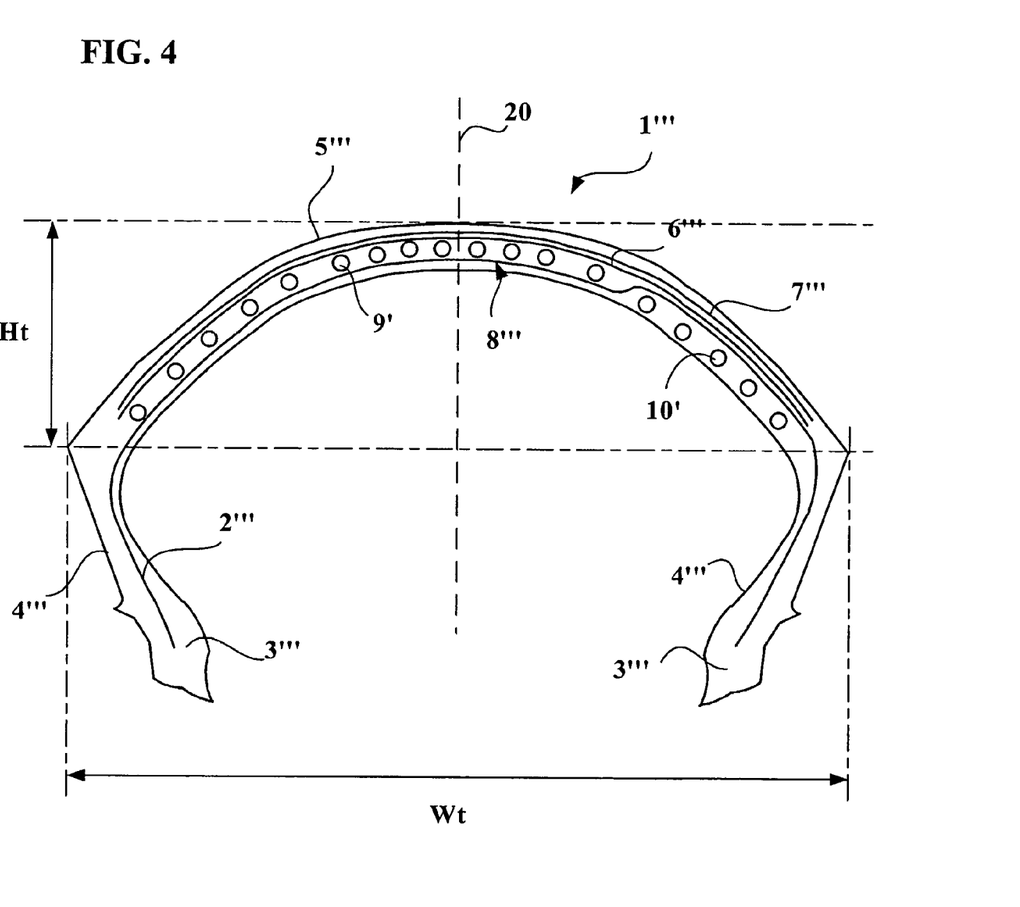
FIG. 4 is a meridian view of a diagram of a tire according to a fourth embodiment of the invention.

FIG. 4 shows, as in the case of FIG. 3, an embodiment of the invention according to which the layer of circumferential reinforcement elements 8''' is provided in a number of parts 9', 10', positioned on the tire at radially different levels. In contrast to FIG. 3, the representation in FIG. 4 does not exhibit symmetry relative to the equatorial plane 20. Such an embodiment may be particularly sought after when use of the tire will itself not be symmetrical; for example, in the case of tires designed for use on specific circuits which subject the tire to camber stress along substantially one side. In fact, the provision of such a tire may be particularly relevant to use on a track where the majority of the curves or bends are in the same direction.

Figure 5:
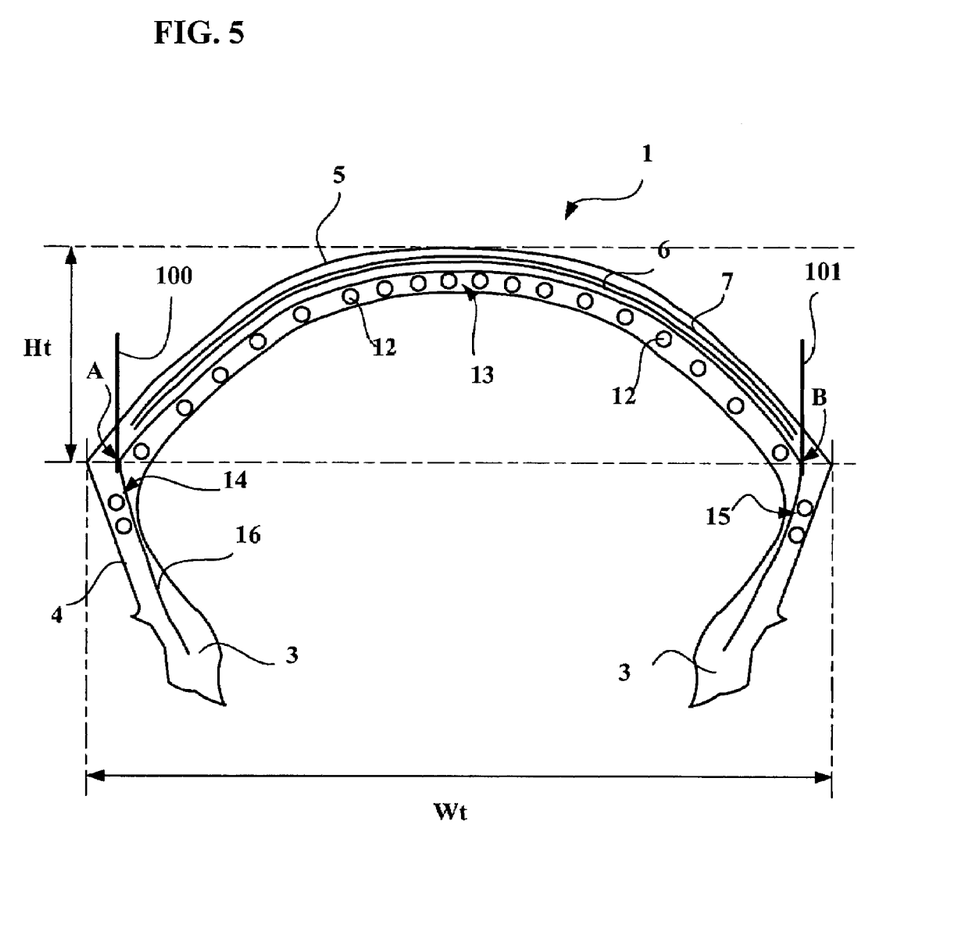
FIG. 5 is a meridian view of a diagram of a tire according to a fourth embodiment of the invention.

FIG. 5 shows an embodiment of the invention according to which the layer of circumferential reinforcement elements 12 is provided in a number of parts 13, 14, 15, two parts 14 and 15 extending in part of the sidewalls. According to the invention, the central part 13 of the layer 12 is positioned radially to the outside of the points A and B and the parts 14 and 15 are positioned radially to the inside of the points A and B. The points A and B are the points of tangency of the curvilinear abscissa of the carcass-type reinforcement structure with the perpendiculars 100, 101 to the axis of rotation. According to this embodiment of the invention, with a view to optimizing the production costs, the parts 14 and 15 are set in place axially to the outside of the carcass-type reinforcement structure 16 so as to be positioned over the smallest possible diameter. For the same reasons, the part 12 is positioned axially to the inside of the carcass-type reinforcement structure 16. Such an embodiment may of course be associated with representations such as those shown in the previous Figures, the part 13 of the layer of circumferential reinforcement elements being capable of being combined with working layers 17, 18 according to the various configurations mentioned above and/or of being provided in several parts so as, for example to be positioned in part radially to the outside of the carcass-type reinforcement structure.

As mentioned above, embodiments of this type allow financial savings on two counts. Firstly, the quantity of material used to form a layer of circumferential reinforcement elements is reduced due to the lower radial position of the layer 8' than that of a conventional tire in which the layer of circumferential reinforcement elements is positioned radially to the outside of the carcass-type reinforcement structure. And consequently, the laying time for the reinforcement cord of said layer of circumferential reinforcement elements is less than that necessary for production of the layer of circumferential reinforcement elements for a conventional tire. The quantity of material may be further reduced due to laying according to a variable pitch, which allows optimization of the quantity of material necessary in the transverse direction.

The invention claimed is:

1. A tire comprising at least a carcass-type reinforcement structure, consisting of at least one layer of carcass reinforcement elements, anchored on either side of the tire to a bead whose base is intended to be mounted on a rim seat, each bead being extended radially towards the outside by a sidewall, the sidewalls meeting up radially towards the outside with a tread, and comprising under the tread a crown reinforcement structure comprising a layer of axially continuous circumferential reinforcement elements, wherein, in accordance with the profile of the tire in a radial plane, said layer of circumferential crown reinforcing elements extends in the sidewalls beyond the two points of tangency of the curvilinear abscissa of the carcass-type reinforcement structure with perpendiculars to the axis of rotation, wherein the part of the layer of circumferential elements, radially to the outside of the two points of tangency of the curvilinear abscissa of the carcass-type reinforcement structure with perpendiculars to the axis of rotation is at least in part radially to the inside of the part of the carcass-type reinforcement structure radially to the outside of the two points of tangency of the curvilinear abscissa of the carcass-type reinforcement structure with perpendiculars to the axis of rotation, wherein the part of the layer of circumferential elements, radially to the inside of the two points of tangency of the curvilinear abscissa of the carcass-type reinforcement structure with perpendiculars to the axis of rotation is radially to the inside of the carcass-type reinforcement structure radially to the inside of the two points of tangency of the curvilinear abscissa of the carcass-type reinforcement structure with perpendiculars to the axis of rotation and, wherein said circumferential reinforcement elements of said layer are distributed in the transverse direction with a variable pitch in the part of the layer of circumferential elements radially to the outside of the two points of tangency of the curvilinear abscissa of the carcass-type reinforcement structure with perpendiculars to the axis of rotation.

2. A tire according to claim 1, wherein said distribution pitch for the circumferential reinforcement elements at the centre (crown) of the tread is smaller than at the edges of said layer of circumferential reinforcement elements.

3. A tire according to claim 1, wherein said distribution pitch for the circumferential reinforcement elements at the centre (crown) of the tread is greater than at the edges of said layer of circumferential reinforcement elements.

4. A tire according to claim 1, wherein the value of the pitch in the transverse direction follows a mathematical progression increasing over at least part of the axial width of said layer.

5. A tire according to claim 1, wherein the value of the pitch follows an arithmetic progression of the type $U(n)=Uo+nr$, with Uo being between 0.4 mm and 2.5 mm and r being the difference of consecutive terms of the progression, said difference being between 0.001 and 0.1.

6. A tire according to claim 1, wherein the value of the pitch follows a geometric progression of the type $U(n)=Uo \times r^n$, with Uo being between 0.4 mm and 2.5 mm and r being the difference of consecutive terms of the progression, said difference being between 1.001 and 1.025.

7. A tire according to claim 1, wherein the reinforcement elements of the carcass-type reinforcement structure form an angle of between 65° and 90° with the circumferential direction.

8. A tire according to claim 1, wherein the crown reinforcement structure comprises at least one working layer consisting of reinforcement elements and wherein, at least in the central zone of said working layer, said reinforcement elements form an angle of between 10 and 80° with the longitudinal direction.

9. A tire according to claim 8, wherein the crown reinforcement structure comprises at least two working layers each consisting of reinforcement elements and wherein, at least in the central zone of said working layer, from one layer to the next said elements form between them angles of between 20 and 160°.

10. A tire according to claim 8, wherein the layer of circumferential reinforcement elements is positioned at least in part radially to the outside of a working layer.

11. A tire according to claim 8, wherein the layer of circumferential reinforcement elements is positioned at least in part radially to the inside of the working layer radially furthest to the inside.

12. A tire according to claim 8, wherein the angles formed by said reinforcement elements of the working layers with the longitudinal direction are variable in the transverse direction and wherein said angles are greater at the axially outer edges of the working layers relative to the angles of said reinforcement elements measured at the level of the equatorial plane of the tire.

13. A tire according to claim 8, wherein the working layer reinforcement elements are of textile material.

14. A tire according to claim 1, wherein the circumferential reinforcement elements are metal and/or textile and/or glass.

15. A tire according to claim 14, wherein the circumferential reinforcement elements exhibit a modulus of elasticity greater than 6000 N/mm².

16. A tire according to claim 1, wherein the crown reinforcement structure comprises a plurality of layers of reinforcement elements.

* * * * *